(12) United States Patent
Nakashima et al.

(10) Patent No.: US 8,265,822 B2
(45) Date of Patent: Sep. 11, 2012

(54) IN-VEHICLE EQUIPMENT CONTROL DEVICE AND IN-VEHICLE EQUIPMENT SETTING METHOD USING THE DEVICE

(75) Inventors: Kazuhiko Nakashima, Ann Arbor, MI (US); Kenji Marunaka, Kariya (JP); Satoshi Inoue, Anjo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 456 days.

(21) Appl. No.: 12/227,239

(22) PCT Filed: Jun. 26, 2007

(86) PCT No.: PCT/JP2007/062786
§ 371 (c)(1),
(2), (4) Date: Nov. 12, 2008

(87) PCT Pub. No.: WO2008/001761
PCT Pub. Date: Jan. 3, 2008

(65) Prior Publication Data
US 2009/0093926 A1    Apr. 9, 2009

(30) Foreign Application Priority Data

Jun. 29, 2006  (JP) .................................. 2006-180171

(51) Int. Cl.
*G06F 17/00* (2006.01)
(52) U.S. Cl. ........................... 701/36; 165/208; 236/1 C
(58) Field of Classification Search .................... 701/36, 701/1, 37; 165/202, 201, 203, 205, 208, 165/211, 212, 289; 62/159, 239, 208, 211; 236/1 B, 1 C, 44 C; 700/277
See application file for complete search history.

(56) References Cited

U.S. PATENT DOCUMENTS

| 6,175,782 | B1 * | 1/2001 | Obradovich et al. ............. 701/1 |
| 7,173,544 | B2 * | 2/2007 | Inoue ............................ 340/905 |
| 7,373,229 | B2 * | 5/2008 | Szczerba et al. ................ 701/36 |
| 7,711,324 | B2 * | 5/2010 | Wutka .......................... 455/41.2 |
| 2002/0082751 | A1 | 6/2002 | Obradovich et al. |

(Continued)

FOREIGN PATENT DOCUMENTS
EP    1 513 038 A2    3/2005
(Continued)

OTHER PUBLICATIONS

Japanese Office Action in Japanese Patent Application No. 2006-180171, dated Jul. 13, 2010 (with partial English translation).

(Continued)

*Primary Examiner* — Thomas Black
*Assistant Examiner* — Marthe Marc-Coleman
(74) *Attorney, Agent, or Firm* — Oliff & Berridge, PLC

(57) ABSTRACT

A disclosed in-vehicle equipment control device "S" includes input units 2 and 3 for increasing and decreasing a set value of in-vehicle equipment, and a set value increase/decrease halting unit 13 for stopping the increase/decrease of the set value when the set value reaches a prescribed value after being increased and decreased by the input units 2 and 3. Further, the in-vehicle equipment control device "S" may further include a set value increase/decrease resuming unit 14 for resuming increasing or decreasing the set value when an input of the input unit 2 or 3 is continued after the increase or decrease of the set value is stopped by the set value increase/decrease halting unit 13.

8 Claims, 5 Drawing Sheets

U.S. PATENT DOCUMENTS

| | | |
|---|---|---|
| 2003/0055648 A1* | 3/2003 | Cragun .................. 704/270 |
| 2006/0021363 A1 | 2/2006 | Mizukoshi |
| 2006/0062382 A1* | 3/2006 | Ronkainen .............. 379/433.06 |
| 2006/0087405 A1* | 4/2006 | Koike et al. .................. 340/5.64 |
| 2006/0196652 A1* | 9/2006 | Nagayama et al. ........... 165/202 |
| 2006/0259219 A1* | 11/2006 | Wakiyama et al. ............. 701/36 |
| 2007/0084484 A1* | 4/2007 | Porter et al. ................... 134/18 |
| 2008/0077291 A1* | 3/2008 | Kolletzki ........................ 701/36 |

FOREIGN PATENT DOCUMENTS

| | | |
|---|---|---|
| FR | 2 873 066 A1 | 1/2006 |
| JP | U-59-117026 | 8/1984 |
| JP | A-60-22512 | 2/1985 |
| JP | A-60-22513 | 2/1985 |
| JP | A-60-174311 | 9/1985 |
| JP | U-01-179005 | 12/1989 |
| JP | U-03-014841 | 2/1991 |
| JP | U-03-019705 | 2/1991 |
| JP | A-04-015119 | 1/1992 |
| JP | A-07-081369 | 3/1995 |
| JP | A-11-259213 | 9/1999 |
| JP | A-2000-050230 | 2/2000 |
| JP | A-2004-230997 | 8/2004 |
| KR | 2003056408 * | 7/2003 |

OTHER PUBLICATIONS

Mar. 23, 2010 Office Action issued in Japanese Patent Application No. 2006-180171 (with translation).

Jan. 18, 2011 Office Action issued in Japanese Patent Application No. 2006-180171 (with translation).

Search Report issued in European Patent Application No. 07767592.4, on Apr. 8, 2010.

* cited by examiner

IN-VEHICLE EQUIPMENT CONTROL DEVICE AND IN-VEHICLE EQUIPMENT SETTING METHOD USING THE DEVICE

TECHNICAL FIELD

The present invention generally relates to an in-vehicle equipment control device and an in-vehicle equipment setting method using the device. More specifically, the present invention relates to an in-vehicle equipment control device and an in-vehicle equipment setting method using the device each capable of easily changing a set value for operating each in-vehicle equipment to a prescribed value.

BACKGROUND ART

Conventionally, there has been known an in-vehicle air conditioning control device in which a switch is provided for adjusting a set temperature, and when the in-vehicle room temperature reaches a prescribed set temperature after the minimum temperature or the maximum temperature is set as the set temperature, the set temperature is automatically returned to a set temperature stored in advance (see, for example, Patent Document 1).

In a case where this in-vehicle air conditioning control device is used, when a user gets in the vehicle and the in-vehicle room temperature is high, the set temperature is decreased down to the minimum set temperature so as to quickly decrease the in-vehicle room temperature. Then, when the in-vehicle room temperature reaches the prescribed set temperature, the set temperature is automatically changed from the minimum set temperature to the stored set temperature (a comfortable temperature), thereby quickly adjusting the in-vehicle room temperature to the comfortable temperature without requiring a readjustment operation by the operator.

Further, there has been known an automatic in-vehicle air conditioning control apparatus including, in addition to a lower direction button and a upper direction button, a reset button for resetting a current set temperature to an initially registered set temperature (see, for example, Patent Document 2).

In a case where the automatic in-vehicle air conditioning control apparatus is used, even when the current set temperature is different from a desired temperature, the registered initial set temperature is set by pressing the reset button. Because of this feature, an operator may start to adjust the set temperature based on the initially registered set temperature.

Patent Document 1: Japanese Patent Application Publication No. 2004-230997
Patent Document 2: Japanese Utility Model Application Publication No. H3-19705

DISCLOSURE OF INVENTION

Problems to be Solved by the Invention

However, as described above, in the in-vehicle air conditioning control device according to Patent Document 1, when the in-vehicle room temperature reaches the prescribed temperature after the setting temperature is set to the maximum set temperature or the minimum set temperature, the set temperature is automatically changed to the stored set temperature. Because of this feature, it is not possible to set the set temperature between the maximum set temperature or the minimum set temperature and the stored set temperature. As a result, the degree of freedom in setting by an operator is disadvantageously reduced.

Further, the automatic in-vehicle air conditioning control apparatus described in Patent Document 2 may not reduce the degree of freedom in setting by an operator. However, the reset button is required in addition to the lower direction button and the upper direction button, which may involve restriction in designing an operations panel including the additional reset button.

The present invention is made in light of the above-mentioned circumstances, and may provide an in-vehicle equipment control device and an in-vehicle equipment setting method using the device capable of easily changing a set value for operating in-vehicle equipment to a prescribed value while maintaining the degree of freedom in setting by an operator and a simple button layout.

Means for Solving the Problems

To that end, according to a first aspect of the present invention, there is provided an in-vehicle equipment control device including an input unit increasing/decreasing a set value of in-vehicle equipment; and a set value increase/decrease halting unit stopping an increase/decrease of the set value when the set value reaches a prescribed value after the set value is continually increased/decreased by the input unit.

According to a second aspect of the present invention, there is provided an in-vehicle equipment control device according to the first aspect, further including a set value increase/decrease resuming unit resuming increasing/decreasing the set value when an input by the input unit continues for a prescribed time period since the increase/decrease of the set value is stopped by the set value increase/decrease halting unit.

According to a third aspect of the present invention, there is provided an in-vehicle equipment control device according to the first or the second aspect, in which the input unit includes a first input unit for increasing the set value and a second input unit for decreasing the set value.

According to a fourth aspect of the present invention, there is provided an in-vehicle equipment control device according to any one of the first aspect through the third aspect, further including an attention-attracting unit attracting an operator's attention when the set value reaches the prescribed value after the set value is continually increased/decreased by the input unit.

According to a fifth aspect of the present invention, there is provided an in-vehicle equipment control device according to any one of the first aspect through the fourth aspect in which the in-vehicle equipment is an in-vehicle air conditioner, and the set value is a set temperature or a set humidity of the in-vehicle air conditioner.

According to a sixth aspect of the present invention, there is provided an in-vehicle equipment control device according to any one of the first aspect through the fifth aspect in which a setting condition of the in-vehicle equipment control device is registered for each operator.

According to a seventh aspect of the present invention, there is provided an in-vehicle equipment control device according to the sixth aspect, in which the setting condition is a recommended set temperature, a time interval of an increasing/decreasing step, or an increasing/decreasing width of the increasing/decreasing step.

According to an eighth aspect of the present invention, there is provided an in-vehicle equipment setting method for setting operations of in-vehicle equipment by using an in-vehicle equipment control device including an input unit for increasing/decreasing a set value of the in-vehicle equipment. The method includes a set value increase/decrease halting step of stopping an increase/decrease of the set value when the set value reaches a prescribed value after the set value is continually increased/decreased by the input unit; and a set value increase/decrease resuming step of resuming increasing/decreasing the set value when an input by the input unit continues for a prescribed time period since the increase/decrease of the set value is stopped in the set value increase/decrease halting step.

Advantageous Effect of the Invention

According to an aspect of the present invention, there is provided an in-vehicle equipment control device and an in-vehicle equipment setting method using the device capable of easily changing a set value for operating in-vehicle equipment to a prescribed value while maintaining the degree of freedom in setting by an operator and a simple button layout.

EXPLANATION OF REFERENCES

1: CONTROLLING SECTION
2, 2a: UP SWITCH
3, 3a: DOWN SWITCH
4, 4a: DISPLAY DEVICE
5: SOUND OUTPUT DEVICE
6: AIR CONDITIONER
10: INPUT MODE DETERMINING SECTION
11: SET VALUE INCREASING/DECREASING SECTION
12: SET VALUE INCREASE/DECREASE CONTINUING SECTION
13: SET VALUE INCREASE/DECREASE HALTING SECTION
14: SET VALUE INCREASE/DECREASE RESUMING SECTION
15: ATTENTION-ATTRACTING SECTION
P, Pa: OPERATIONS PANEL
S: IN-VEHICLE EQUIPMENT CONTROL DEVICE

BEST MODE FOR CARRYING OUT THE INVENTION

Figure 1:
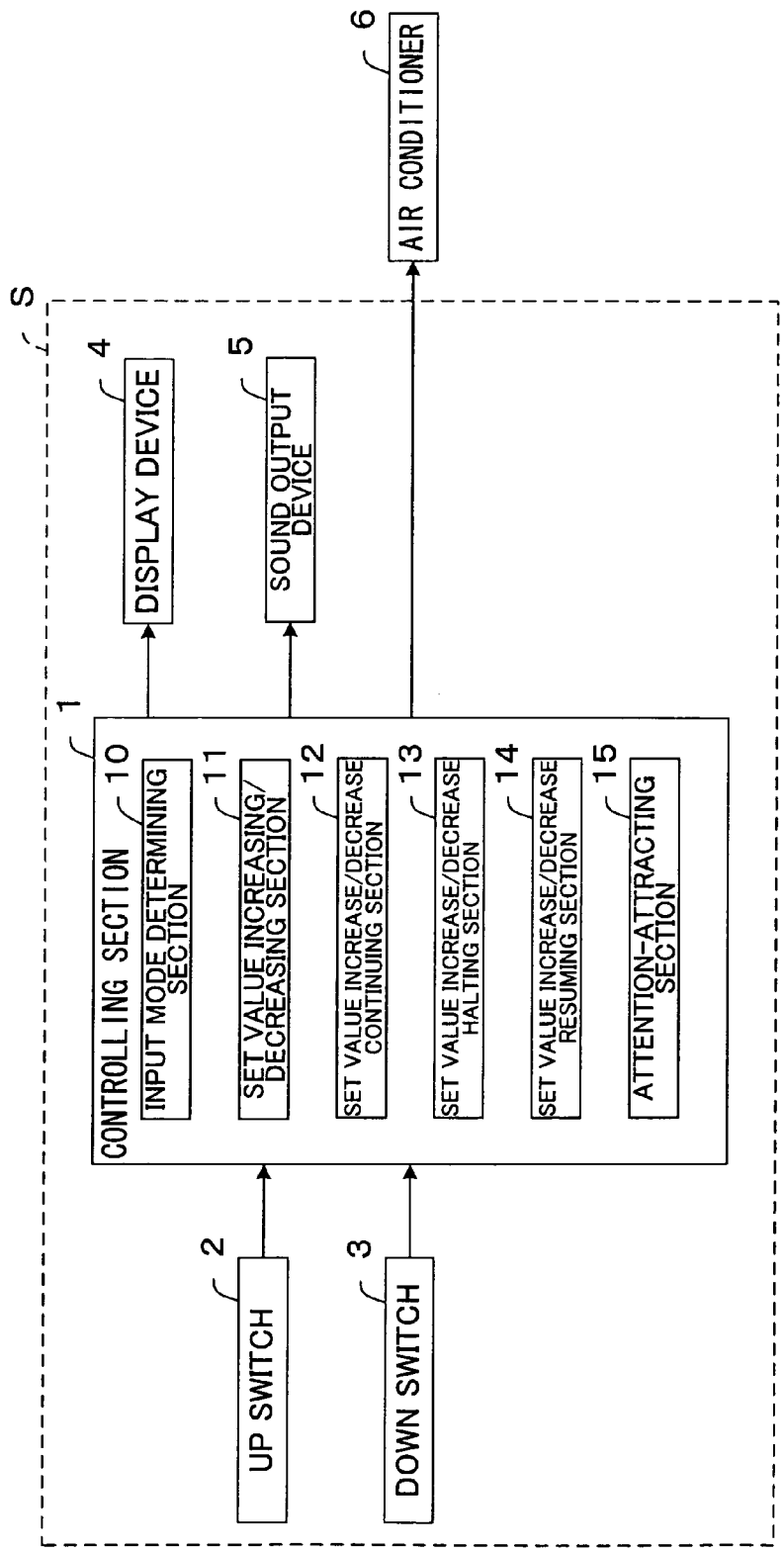
FIG. 1 is a block diagram showing an exemplary configuration of an in-vehicle equipment control device according to an embodiment of the present invention.

In the following, a best mode for carrying out the present invention is described with reference to the accompanying drawings.
[First Embodiment]
FIG. 1 shows an exemplary configuration of an in-vehicle equipment control device "S" according to an embodiment of the present invention.

The in-vehicle equipment control device "S" includes a controlling section 1, an UP switch 2, a DOWN switch 3, a display device 4, and a sound output device 5. Further, the in-vehicle equipment control device "S" is connected to an air conditioner 6 via an in-vehicle network such as a Controller Area Network (CAN) and a Local Interconnect Network (LIN). It should be noted that the in-vehicle equipment control device "S" may be integrated into the air conditioner 6 as a partial function of the air conditioner 6.

The controlling section 1 may be a computer including a Central Processing Unit (CPU), a Random Access Memory (RAM), a Read Only Memory (ROM), and a Non-Volatile Random Access Memory (NVRAM). In the controlling section 1, the programs corresponding to an input mode determining section 10, a set value increasing/decreasing section 11, a set value increase/decrease continuing section 12, a set value increase/decrease halting section 13, a set value increase/decrease resuming section 14, and an attention-attracting section 15 are stored in the NVRAM and loaded into the RAM so that the processes corresponding to the programs can be executed by the CPU.

Figure 2:
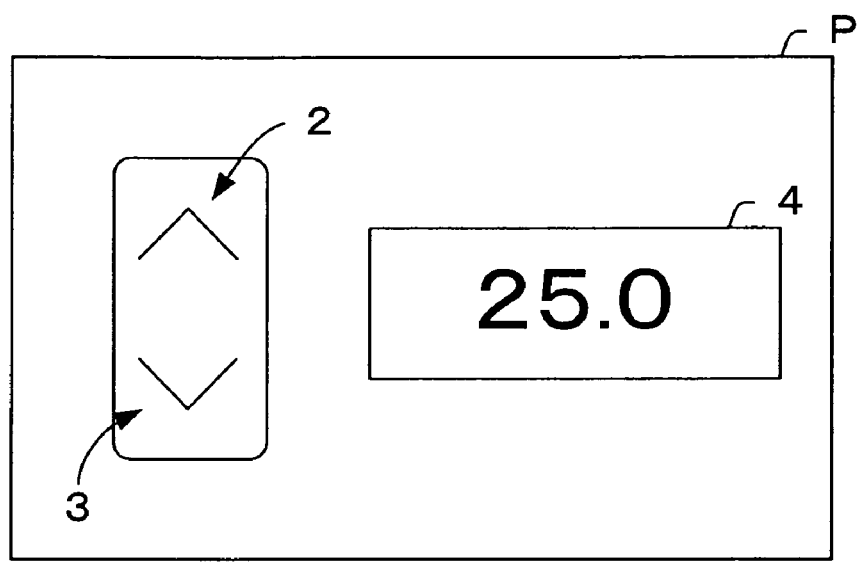
FIG. 2 is a drawing showing an exemplary screen of an operations panel.

The UP switch 2 and the DOWN switch 3 are input means for increasing and decreasing, respectively, a set value for in-vehicle equipment. The UP switch 2 and the DOWN switch 3 may be separately provided as membrane switches or touch panel switches. Further, as shown in FIG. 2, the UP switch 2 and the DOWN switch 3 may be integrally provided in a single seesaw switch, so that when either the UP switch 2 or the DOWN switch 3 is pressed, and when an operator removes his/her hand from the seesaw switch, the seesaw switch is returned to its neutral position.

The UP switch 2 and the DOWN switch 3 may be used for increasing and decreasing, respectively, a set temperature value and a set humidity value of the air conditioner 6, a set brightness value of a room light, a set volume value of in-vehicle speakers, a set speed value of the wipers, or the like.

The display device 4 may display the set values increased and decreased by the UP switch 2 and DOWN switch 3, respectively, and may be a Light Emitting Diode (LED) display or a Liquid Crystal Display (LCD). The display device 4 displays the set values in digital form, analog form, bargraph form, or the like.

The sound output device 5 signals that the set value increased or decreased by the UP switch 2 or the DOWN switch 3 reaches a predetermined value by using an in-vehicle speaker, a buzzer, or the like.

Next, each section in the controlling section 1 is described.

The input mode determining section 10 determines an input mode of the switch, namely whether the input mode of the UP switch 2 or the DOWN switch 3 being pressed is a long-press mode, a short-press mode, or the like.

The term "input mode" refers to how the switch is operated by an operator. The input mode includes the long-press mode, the short-press mode, a strong-press mode, a weak-press mode, and an intermittent-press mode.

The "long-press mode" refers to where a switch is pressed and held for a specified time period (for example, one second) or more. The "short-press mode" refers to where a switch is pressed and held less than a specified time period (for example, one second). In addition, when a switch is a dial type or a toggle type switch, whether the input mode of a switch is the "long-press mode" or the "short-press mode" may be determined based on the time period when the dial or toggle is being rotated or tilted and held.

Further, the terms "strong-press mode" and "weak-press mode" refer to the modes where the switch is pressed with a prescribed force or more and with a force less than the prescribed force, respectively. The term "intermittent-press mode" refers to a mode where the switch is intermittently pressed a prescribed number of times (for example, twice) or more in a prescribed time period (for example, one second).

When it is determined that the input mode is the "short-press mode", the set value increasing/decreasing section 11 increases/decreases a set value by one unit (for example, 0.5° C.). For example, when the UP switch 2 is pressed and it is determined that the input mode of the UP switch is the "short-press mode", a value 0.5° C. is added to the set value before the switch is pressed (for example 25° C.), and the set value after 0.5° C. is added to the set value before the switch is pressed is displayed on the display device 4 and is transmitted to the air conditioner 6. Further, when the "short-press mode" input of the UP switch 2 is intermittently repeated plural times, the set value increasing/decreasing section 11 increase a set value by 0.5° C. each time when the UP switch is pressed in the "short-press mode". It should be noted that when the DOWN switch 3 is pressed, the set value changes in the same manner but in the reverse direction, i.e. in the decreasing direction.

Further, in the in-vehicle equipment control device "S", the sound output device 5 may output sound to attract an operator's attention each time the set value is increased/decreased by one unit or plural units. Because of this feature, an operator may recognize the set temperature value without the necessity of watching the display unit 4.

When it is determined that the input mode is the "long-press mode", the set value increase/decrease continuing section 12 continually increases or decreases a set value. For example, when the UP switch 2 is pressed and it is determined that the input mode of the UP switch 2 is the "long-press mode", a value 0.5° C. is added to a set value (for example, 25° C.) per a prescribed time period (for example, 0.4 seconds), and the set value after the additions (for example, the value is 30° C. when the switch is pressed for four seconds) is displayed on the display device 4 and is transmitted to the air conditioner 6.

The set value increase/decrease halting section 13 stops the increase or decrease of a set value when the set value reaches a prescribed value.

For example, when the UP switch 2 is pressed in the "long-press mode" after a set temperature of the air conditioner 6 is first set to the allowable minimum temperature (for example, 18° C.) to rapidly decrease the vehicle room temperature where the recommended set temperature is 25° C., the set value increase/decrease continuing section 12 continually increases the set temperature (from 18° C.) by 0.5° C. per 0.4 seconds. As a result, after 5.6 seconds have passed, the set temperature reaches the recommended set temperature (25° C.).

However, when the set temperature reaches the recommended set temperature (25° C.), the set value increase/decrease halting section 13 stops the increase of the set temperature.

Namely, once the set temperature reaches the recommended set temperature (25° C.), the set value increase/decrease halting section 13 does not allow further increase of the set temperature even when the UP switch 2 is being pressed continually, and maintains the set temperature at the recommended set temperature (25° C.)

By doing this, the in-vehicle equipment control device "S" allows an operator to rapidly increase and decrease the set temperature, and simply and rapidly set the set temperature to be the recommended set temperature without the necessity of watching an operations panel "P" (see FIG. 2) or checking the current set temperature displayed on the display device 4.

The set value increase/decrease resuming section 14 resumes increasing/decreasing a set value when the input of a switch for increasing/decreasing the set value has been continued for a certain period of time (hereinafter referred to as "increase/decrease halting time") since the increase/decrease of the set value is stopped by the set value increase/decrease halting section 13.

For example, after the increase of the set temperature of the air conditioner 6 has been stopped at 25° C. by the set value increase/decrease halting section, the UP switch is further and continually pressed in the "long-press mode" for the "increase/decrease halting time" (for example, two seconds), and the increase of the set temperature is resumed at the rate of 0.5° C. per 0.4 seconds the same as that before the increase had been first stopped.

It should be noted that an increasing/decreasing width of an increasing/decreasing step (for example, from 0.5° C. to 1° C. per step) and a time interval of the increasing/decreasing step (for example, from 0.4 seconds to one second) may differ between before and after the set temperature reaches the recommended set temperature. This is because finer adjustment may be required when the set temperature reaches the recommended set temperature.

Further, the "increase/decrease halting time" may be determined based on the consideration of the time period in which an operator may normally stop increasing/decreasing the set temperature at the recommended set temperature and the time period that may not give an impression to an operator that it takes too long before the increase/decrease of the set value is resumed.

For example, a time period "Ta" from when the set temperature value reaches the recommended set temperature to when an operator recognizes that the set temperature value reaches the recommended set temperature is one second. This is because when two or three times of the information sound repeating every 0.4 seconds is stopped, the operator normally recognizes that the increase/decrease is not being performed.

Further, a response time "Tb" from when an operator recognizes that the increase/decrease is not being performed to when the operator stops pressing the switch is approximately 0.5 seconds based on experiments. Further, a time period "Tc" that gives an impression to an operator that it takes too long to resume the increase/decrease is one second.

Based on the above time periods and response time, a minimum value "Td" of the "increase/decrease halting time" from when the increase/decrease is stopped to when the increase/decrease is resumed is 1.5 seconds, which is obtained by adding the "Tb" to the "Ta", and a maximum value "Te" of the "increase/decrease halting time" is 2 seconds obtained by adding the "Tc" to the "Ta". Namely, when the "increase/decrease halting time" is shorter than the minimum value "Td", an operator may have difficulty in stopping the increase/decrease at the recommended set temperature. On the other hand, when the "increase/decrease halting time" is longer than the maximum value "Te", an operator may feel that the response is too slow.

In this embodiment, the "increase/decrease halting time" is the maximum value "Te" so that an operator can normally stop the increase/decrease at the recommended set temperature.

It should be noted that the set value increase/decrease resuming section 14 does not prevent an operator from removing his/her hand from the switch once the increase/decrease is stopped by the set value increase/decrease halting section 13 and pressing the switch again to resume the increase/decrease the set value. Namely, the operator doesn't have to continually press the switch and wait until the increase/decrease of the set value is resumed; the operator may remove his/her hand from the switch once and press the switch again to quickly resume increasing/decreasing the set temperature.

The attention-attracting section 15 drives various devices for attracting the operator's attention when the set value is continually increased/decreased and reaches a prescribed value. For example, when the UP switch 2 is pressed in the "long-press mode" and the set temperature of the air conditioner 6 reaches the recommended set temperature, the attention-attracting section 15 drives the sound output device 5 to output a sound to inform the operator that the set temperature has reached the recommended set temperature. It should be noted that the attention-attracting section 15 may drive a light emitting device or a vibration generator to inform the operator that the set temperature has reached the recommended set temperature.

Further, in the in-vehicle equipment control device "S", when the information sound from the sound output device 5 is output every time when the set value is increased/decreased by one unit or plural units, the sound output from the attention-attracting section 15 may be different from the information sound from the sound output device 5. This is because an operator can distinguish the sound signaling the increase/decrease of the set value from the sound signaling that the set value has reached a prescribed value.

By doing this, the operator may recognize that the set value has reached the recommended set value and perform a further fine adjustment of the set value.

Figure 3:
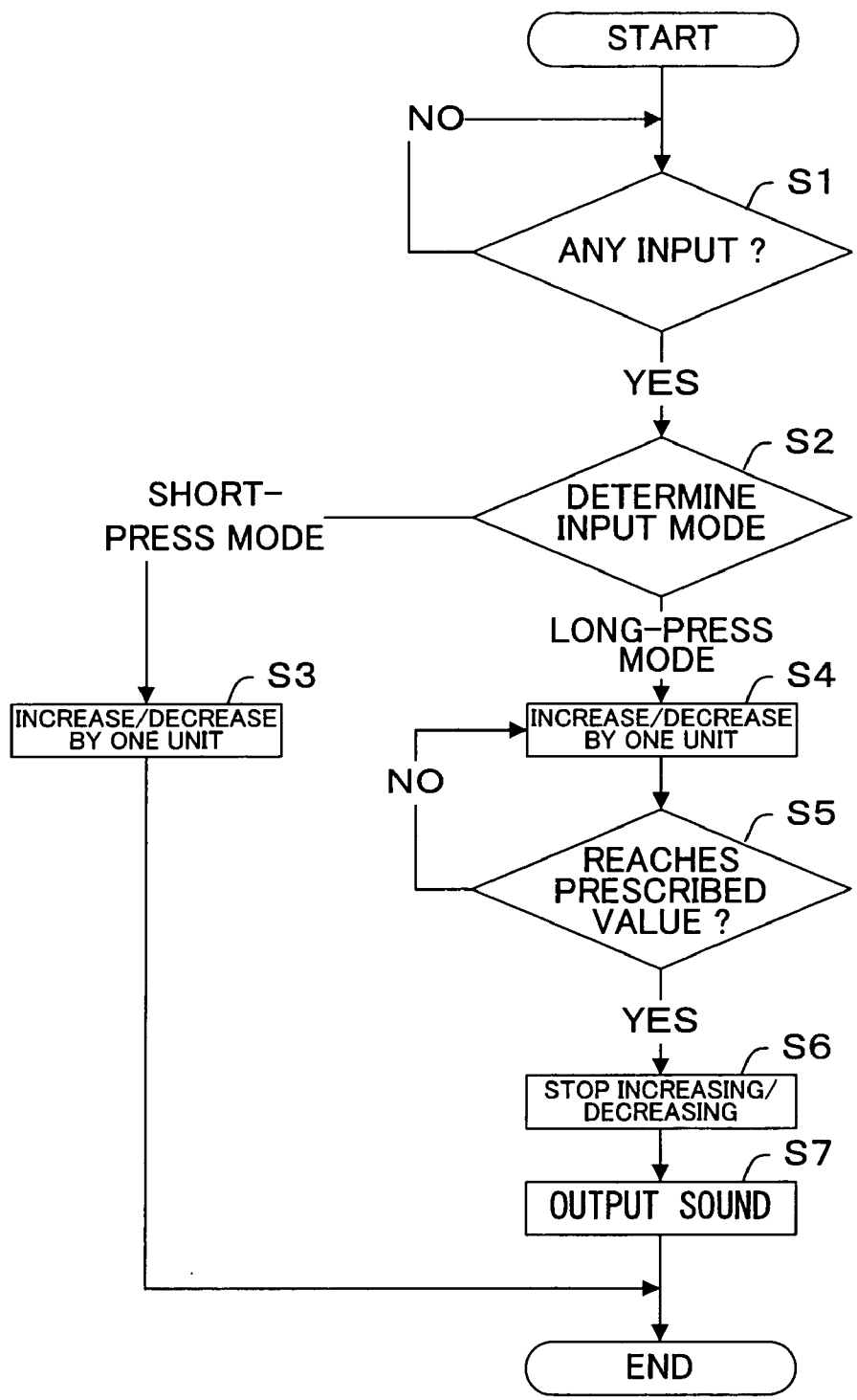
FIG. 3 is a flowchart showing a process of setting a set temperature of an air conditioner.

Next, a process of setting the set temperature of the air conditioner 6 is described with reference to FIG. 3.

First, the in-vehicle equipment control device "S" observes whether the UP switch 2 or the DOWN switch 3 on the operations panel "P" is pressed (step S1), and waits until one of the switches is pressed (NO in step S1).

When one of the switches is pressed (YES in step S1), the input mode determining section 10 in the in-vehicle equipment control device "S" determines the input mode of the switch (step S2). When the UP switch 2 is pressed and it is determined that the input mode of the UP switch 2 is the "short-press mode", ("short-press mode" in step S2), the set value increasing/decreasing section 11 in the in-vehicle equipment control device "S" increases the set temperature of the air conditioner 6 by one unit (for example, 0.5° C.) (step S3), and the process ends.

On the other hand, when the UP switch 2 is pressed and it is determined that the input mode of the UP switch 2 is the "long-press mode", ("long-press mode" in step S2), the set value increase/decrease continuing section 12 in the in-vehicle equipment control device "S" continually increases the set temperature of the air conditioner 6 by one unit again and again unless the pressing operation of the UP switch 2 is interrupted (step S4), and observes whether the set temperature reaches a prescribed temperature (for example, 25° C.) (step S5). When the UP switch 2 is pressed and it is determined that the set temperature does not reach the prescribed temperature (NO in step S5), the in-vehicle equipment control device "S" continues to increase the set temperature of the air conditioner 6.

On the other hand, when the UP switch 2 is pressed and it is determined that the set temperature reaches the prescribed temperature (YES in step S5), the set value increase/decrease halting section 13 in the in-vehicle equipment control device "S" stops the increase of the set temperature of the air conditioner 6 (step S6). Then, the attention-attracting section 15 drives a sound output device 5 to output an alarm sound (step S7), and the process ends.

It should be noted that the input mode determining section 10 in the in-vehicle equipment control device "S" may determine whether the input mode of the switch is the "strong-press mode" or the "weak-press mode". Based on the determination result, the same process as described above may be performed.

Next, the relationships between output signal level from a switch (in an upper side) and the corresponding set temperatures (in a lower side) with time are described with reference to FIGS. 4A through 4D.

Figure 4:
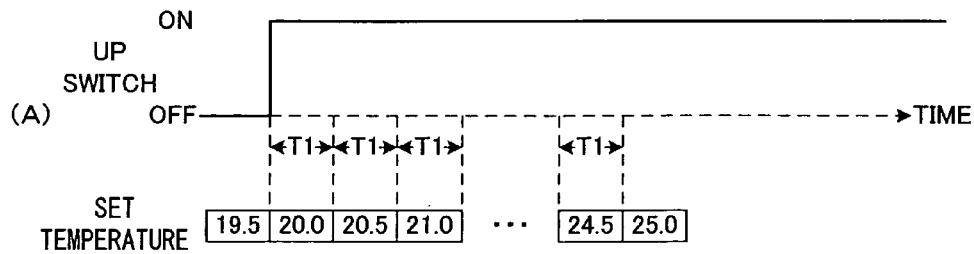
FIGS. 4A through 4D are drawings each showing the relationships between output signal level from a switch and the corresponding set temperatures with time.
Figure 4:
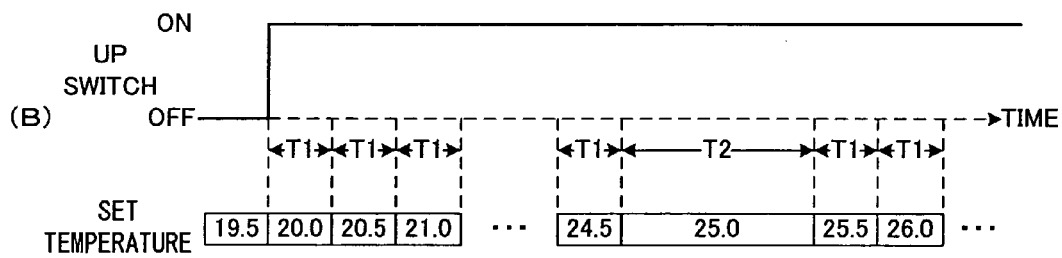
Figure 4:
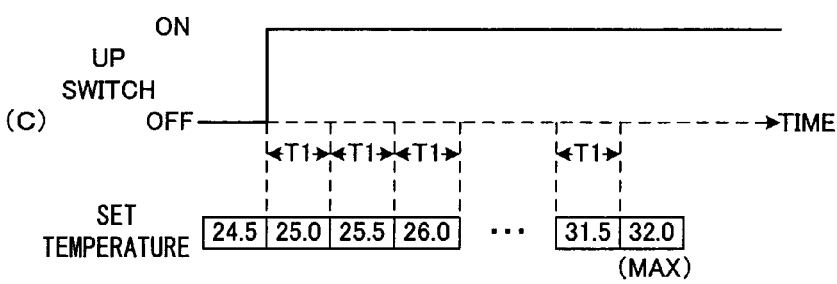
Figure 4:
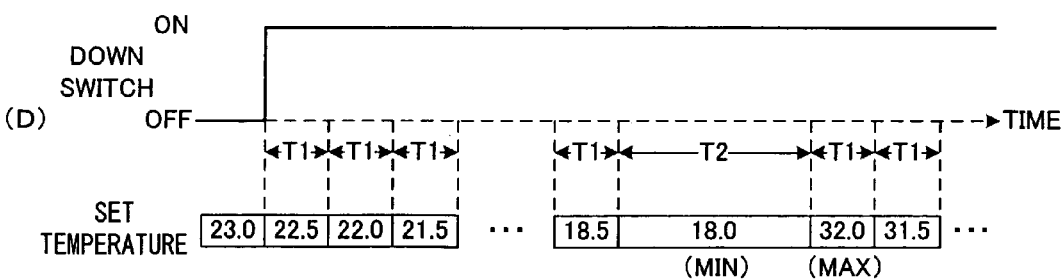

In each of FIGS. 4A through 4D, a voltage level output from a switch with time is shown in an upper side, the corresponding set temperatures of the air conditioner 6 with time are shown in a lower side, and time elapses from left to right. FIG. 4A shows a case where the UP switch 2 is pressed in the "long-press mode" when the set temperature is 19.5° C. to increase the set temperature up to the recommended set temperature (25° C.). FIG. 4B shows a case where the UP switch 2 is pressed in the "long-press mode" when the set temperature is 19.5° C. to increase the set temperature beyond the recommended set temperature (25° C.). FIG. 4C shows a case where the UP switch 2 is pressed in the "long-press mode" when the set temperature is 24.5° C. to increase the set temperature beyond the recommended set temperature (25° C.). FIG. 4D shows a case where the DOWN switch 3 is pressed in the "long-press mode" when the set temperature is 23.0° C. to decrease the set temperature beyond an allowed minimum temperature (18° C.).

In a case of FIG. 4A, the UP switch 2 is pressed in the "long-press mode" when the set temperature is 19.5° C. As a result, the set temperature is continually increased by one unit (0.5° C.) per "T1" (0.4 seconds) period. When the set temperature reaches the recommended set temperature (25° C.), the increase is stopped. In this setting method, to increase the set temperature beyond the recommended set temperature (25° C.), an operator has to remove his/her hand from the UP switch 2 once and press the UP switch 2 again.

FIG. 4B show another method different from the method in FIG. 4A. In the method in FIG. 4B, when the UP switch 2 is continually pressed after the set temperature reaches the recommended set temperature (25° C.), the set temperature is temporarily stopped at the recommended set temperature (25° C.) for a time period of "T2" (two seconds), then is started to be increased again. When this method is used, an operator does not have to remove his/her hand from the UP switch 2 first to increase the set temperature beyond the recommended set temperature (25° C.).

FIG. 4C shows still another method different from any of the methods in FIGS. 4A and 4B. In the method in FIG. 4C, the UP switch 2 is continually pressed in the "long-press mode" when the set temperature is 24.5° C. As a result, the set temperature is continually increased by one unit (0.5° C.) per "T1" (0.4 seconds) period until the set temperature reaches the allowed maximum temperature (32° C.). In this method, even when an operator increases the set temperature beyond the recommended set temperature (25° C.), the increase of the set temperature does not temporarily stop when the set temperature reaches the recommended set temperature (25° C.).

This is because the set temperature when the UP switch 2 is pressed is 24.5° C. which is lower than the recommended set temperature by just one unit, and accordingly an operator can easily set the set temperature at the recommended set temperature by pressing just once in the "short-press mode".

On the other hand, when the UP switch 2 is pressed in the "long-press mode", the in-vehicle equipment control device "S" is capable of recognizing that the operator intends to increase the set temperature beyond the recommended set temperature. In this case, when the increase of the set temperature is temporarily stopped at the recommended set temperature (25° C.), the operator may feel that this stop is inconvenient.

It should be noted that even when the difference between the set temperature upon a switch being pressed and the recommended set temperature is two units or more, the in-vehicle equipment control device "S" may perform the same process as described above when the difference is one unit.

FIG. 4D shows still another method different from any of the methods in FIGS. 4A through 4C. In the method in FIG. 4D, the DOWN switch 3 is pressed in the "long-press mode" when the set temperature is 23.0° C. As a result, the set temperature is continually decreased by one unit (0.5° C.) per "T1" (0.4 seconds) period until the set temperature reaches the allowed minimum temperature (18° C.). When the DOWN switch 3 is further continually pressed after the set temperature reaches the allowed minimum temperature, the decrease of the set temperature is temporarily stopped at the allowed minimum temperature (18° C.) for a time period of "T2" (two seconds), and then the decrease of the set temperatures resumes from the allowed maximum temperature (32° C.).

As described above, by allowing a switch to change the set temperature from the allowed minimum temperature to the allowed maximum temperature, only a single switch may be enough for an operator to change the set temperature to a desired value instead of using the two switches UP switch 2 and DOWN switch 3.

It should be noted that when only one switch is provided in the in-vehicle equipment control device "S", whether the set temperature is to be changed in the increasing or decreasing direction when the switch is pressed may be determined based on an external temperature or a vehicle room temperature. For example, when the external temperature is higher than the recommended set temperature, the in-vehicle equipment control device "S" controls so that the set temperature is to be decreased upon the switch being pressed. On the other hand, when the external temperature is lower than the recommended set temperature, the in-vehicle equipment control device "S" controls so that the set temperature is increased upon the switch being pressed. Further, the in-vehicle equipment control device "S" may change the set temperature in the increasing direction or in the decreasing direction so that the set temperature approaches the recommended set temperature.

Further, the in-vehicle equipment control device "S" may include plural values at which the increase/decrease of the set temperature can be stopped, the plural values including the allowed maximum temperature, the recommended set temperature, and the allowable minimum temperature. By doing this, an operator may easily change the set temperature to a desired value without watching the operations panel "P". Further, the in-vehicle equipment control device "S" may output each different sound signaling that the set temperature reaches the corresponding value. By doing this, the operator may easily know which value the set temperature reaches.

As described above, the in-vehicle equipment control device "S" may quickly and easily perform a process of rapidly increasing/decreasing the set temperature of the air conditioner 6 first and then return the set temperature to an appropriate set temperature value.

[Second Embodiment]

Figure 5:
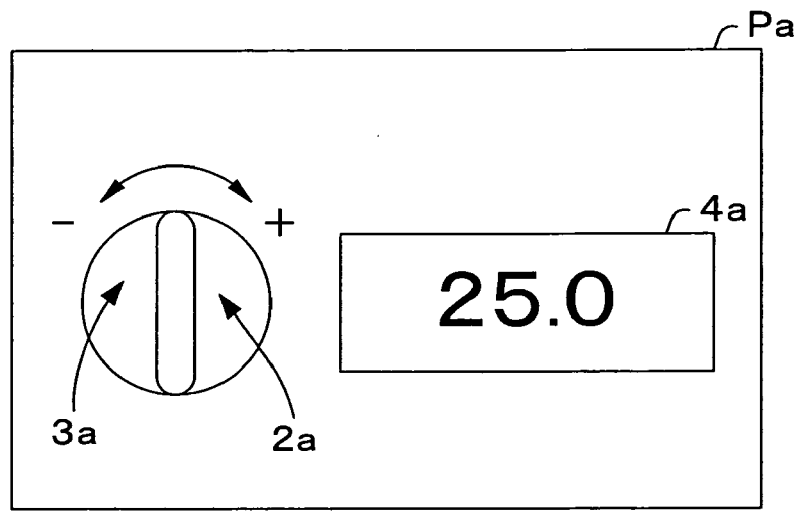
FIG. 5 is a drawing showing another exemplary screen of the operations panel.

FIG. 5 shows another exemplary screen of the operations panel "P". The screen of the operations panel "Pa" in FIG. 5 is different from that in FIG. 2 in that the operations panel "Pa" includes a dial switch while the operations panel "P" includes a seesaw switch.

When the dial switch is rotated in the clockwise direction or in the counterclockwise direction, the set temperature is increased or decreased, respectively, by one unit. Then, when an operator removes his/her hand from the dial switch, the dial switch returns to its neutral position.

Further when the dial switch is rotated in the clockwise direction or in the counterclockwise direction, and is held at its rotated position (corresponding to the "long-press mode"), the increase or decrease, respectively, of the set temperature continues. By using the dial switch, the in-vehicle equipment control device "S" may perform the same operations as performed when the seesaw switch is used.

[Others]

In the above descriptions, exemplary embodiments according to the present invention are described. However, the present invention is not limited to the embodiments. It should be understood that various modifications and substitutions may be made without departing from the scope of the present invention.

For example, in the above description, when the UP switch 2 or the DOWN switch 3 is pressed in the "long-press mode", the in-vehicle equipment control device "S" may stop the increase or decrease, respectively, of the set temperature based on the fact that the set temperature has reached the recommended set temperature. However, the in-vehicle equipment control device "S" may determine whether the increase or decrease of the set temperature is to be stopped based on the set temperature before being changed, the vehicle room temperature, and the increasing/decreasing direction. For example, when the set temperature before being changed is 26° C., the room temperature of the vehicle is 35° C. or more, and the DOWN switch is pressed in the "long-press mode", the in-vehicle equipment control device "S" estimates that the operator intends to set the set temperature at a lower temperature, and controls so that the increase/decrease of the set temperature is not stopped at the recommended set temperature (25° C.).

As described above, when each of the set temperature before being changed and the room temperature of the vehicle is higher than the recommended set temperature and the room temperature of the vehicle is higher than a prescribed value (for example, 35° C.), the in-vehicle equipment control device "S" controls so that the set temperature is continually decreased down to a lower set temperature without being temporarily stopped at the recommended set temperature. By doing this, the convenience for an operator who intends to quickly decrease the set temperature may be enhanced. It should be noted that this method may also be applied to a case where the set temperature is required to be increased quickly.

In the above descriptions, the in-vehicle equipment control device "S" sets 25° C. as the recommended set temperature. However, any other value may be registered as the recommended set temperature. Further, setting conditions such as the recommended set temperature, a time interval of one step when the set temperature is increased/decreased, and an increased/decreased width of one step when the set temperature is increased/decreased may be independently registered for each operator, and the recommended set temperature of an operator may be applied when the operator is authenticated by using his/her fingerprint, iris, password, or the like.

Further, in the above embodiments, the increase/decrease halting time is two seconds. However, the response times "Tb" may differ depending on the operators. Because of this feature, the in-vehicle equipment control device "S" may learn an appropriate response time "Tb" for each operator and adjust the increase/decrease halting time for each operator. As a result, the convenience for each operator may be enhanced.

The terms "an UP switch 2" and "a DOWN switch 3" in the above embodiments correspond to the terms "a first input unit" and "a second input unit", respectively, described in claims of the present invention.

The present international application claims priority from Japanese Patent Application No. 2006-180171 filed on Jun. 29, 2006, the entire contents of which are hereby incorporated herein by reference.

The invention claimed is:

1. An in-vehicle equipment control device comprising:
an input unit increasing/decreasing a set value of in-vehicle equipment;
an input status determination unit determining whether an input mode of the input unit is a long-press mode or a short-press mode;
a set value increase/decrease halting unit stopping the increase/decrease of the set value when the set value reaches a prescribed value registered in the in-vehicle equipment control device after the set value is continually increased/decreased by the input unit; and
a set value increase/decrease resuming unit resuming the increasing/decreasing of the set value when an input by the input unit in the long-press mode continues for a prescribed time period since the increase/decrease of the set value is stopped by the set value increase/decrease halting unit.

2. The in-vehicle equipment control device according to claim 1, wherein
the input unit includes a first input unit for increasing the set value and a second input unit for decreasing the set value.

3. The in-vehicle equipment control device according to claim 1, further comprising:
an attention-attracting unit attracting an operator's attention when the set value reaches the prescribed value after the set value is continually increased/decreased by the input unit.

4. The in-vehicle equipment control device according to claim 1, wherein
the in-vehicle equipment is an in-vehicle air conditioner; and
the set value is a set temperature or a set humidity of the in-vehicle air conditioner.

5. The in-vehicle equipment control device according to claim 4, wherein
the set value increase/decrease halting unit determines whether the increase/decrease of the set value is to be stopped by estimating an operator's intention based on a set value before being increased/decreased, an increasing or decreasing direction, and a room temperature of the vehicle.

6. The in-vehicle equipment control device according to claim 1, wherein
a setting condition of the in-vehicle equipment control device is registered for each operator.

7. The in-vehicle equipment control device according to claim 6, wherein
the setting condition is a recommended set temperature, a time interval of an increasing/decreasing step, or an increasing/decreasing width of the increasing/decreasing step.

8. An in-vehicle equipment setting method for setting operations of in-vehicle equipment by using an in-vehicle equipment control device including an input unit for increasing/decreasing a set value of the in-vehicle equipment, the method comprising:
determining whether an input mode of the input unit is a long-press mode or a short-press mode;
stopping the increase/decrease of the set value when the set value reaches a prescribed value registered in the in-vehicle equipment control device after the set value is continually increased/decreased by the input unit; and
resuming the increasing/decreasing of the set value when an input by the input unit in the long-press mode continues for a prescribed time period since the increase/decrease of the set value is stopped in the set value increase/decrease halting step.

* * * * *